United States Patent
Ehrmaier et al.

(10) Patent No.: US 6,631,654 B2
(45) Date of Patent: Oct. 14, 2003

(54) DRIVING POSITION SELECTOR WITH AN EMERGENCY RELEASE FOR A PARKING POSITION

(75) Inventors: Rudolf Ehrmaier, Munich (DE); Norbert Woeste, Munich (DE); Josef Neuner, Raubling (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 97 days.

(21) Appl. No.: 09/730,733

(22) Filed: Dec. 7, 2000

(65) Prior Publication Data

US 2001/0006009 A1 Jul. 5, 2001

(30) Foreign Application Priority Data

Dec. 22, 1999 (DE) .......................... 199 62 243

(51) Int. Cl.$^7$ .......................... F16H 59/08; B60K 20/00
(52) U.S. Cl. .............. 74/473.15; 74/473.23; 74/502.2; 192/219.6
(58) Field of Search .............. 74/479.01, 500.5, 74/501.6, 502, 502.2, 473.15, 473.23; 192/219.5, 219.6, 220.2, 220.6, 220.7

(56) References Cited

U.S. PATENT DOCUMENTS

| | | | | | |
|---|---|---|---|---|---|
| 1,646,970 A | * | 10/1927 | Martel | ...................... | 74/473.23 |
| 2,966,244 A | * | 12/1960 | Schreyer | ................... | 74/480 R |
| 4,526,057 A | * | 7/1985 | Mochida et al. | ........... | 74/502.2 |
| 5,794,748 A | * | 8/1998 | Heuver et al. | ........... | 192/220.2 |
| 5,954,179 A | * | 9/1999 | Osborn | ................... | 192/220.7 |
| 6,179,108 B1 | * | 1/2001 | Gierer et al. | ................ | 192/218 |

FOREIGN PATENT DOCUMENTS

| | | |
|---|---|---|
| DE | 43 17 257 C1 | 5/1993 |
| DE | 44 22 257 C1 | 11/1995 |
| DE | 196 43 812 A1 | 10/1996 |
| DE | 198 37 832 | * 2/2000 |

* cited by examiner

Primary Examiner—William C Joyce
(74) Attorney, Agent, or Firm—Crowell & Moring LLP

(57) ABSTRACT

A driving position selector for selecting at least the driving steps of the automatic transmission, "D", "N", "R", "P", which are selected by the driver over a control device and engaged by electro-hydraulic setting elements is provided. It is possible to disengage a parking position by a release device in the automatic transmission housing. An operating device is connected by a Bowden cable with a release lever of the release device. The swiveling motion of the release lever is not transferred to the Bowden traction cord, since the release lever can move along a Bowden traction cord suspended in the release lever.

6 Claims, 1 Drawing Sheet

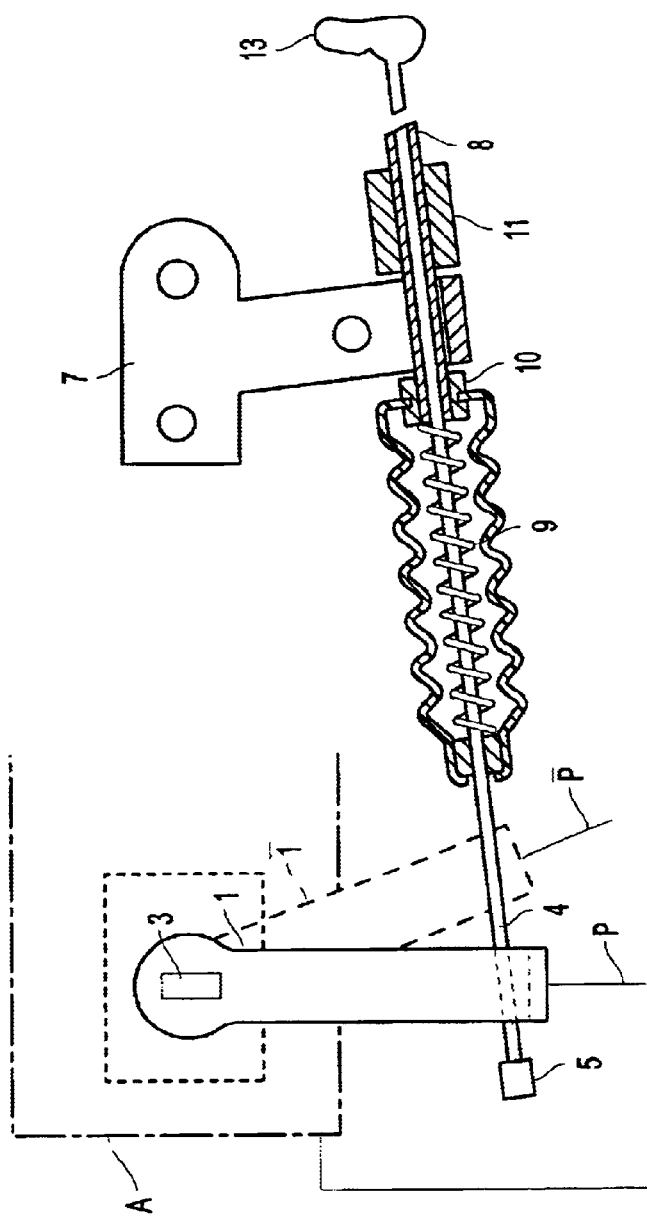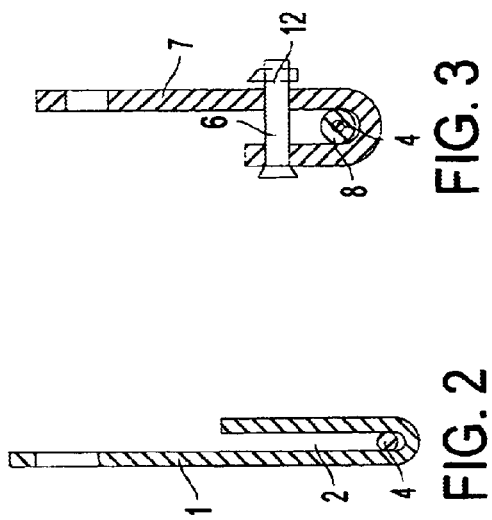
FIG. 1
FIG. 2
FIG. 3

DRIVING POSITION SELECTOR WITH AN EMERGENCY RELEASE FOR A PARKING POSITION

BACKGROUND AND SUMMARY OF THE INVENTION

This application claims the priority of German Patent Application No. 199 62 243.4, filed in Germany, Dec. 22, 1999, the disclosure of which is expressly incorporated by reference herein.

The invention relates to a driving position selector with an emergency release for a parking position of an automatic transmission of an automobile, with the driving position selector for selecting at least the driving steps of the automatic transmission, "D", "N", "R", "P" of an automobile, which are selected by the driver over a control device and engaged by electro-hydraulic setting elements activated by a transmission control device, it being possible to disengage a parking position, engaged in the "P" driving position, by a release device in the automatic transmission housing, which can be activated by the driver over an operating device, especially a hand lever, for which reason the operating device is connected by a Bowden cable with a release lever of the release device and the release lever is mounted firmly on an axis, which is rotated back and forth by the electro-hydraulic setting elements when the parking position is engaged and disengaged and, with that, swivels the release lever forward and backward.

The operating range of an automatic transmission is divided into different manually selectable operating positions, which are referred to as driving positions. The concept of driving positions, as used here, includes all driving positions of an automatic transmission, and also the parking position and the neutral position.

It is already known that the driving positions of an automatic transmission of a motor vehicle, selected by the driver at a control device, can be engaged by electro-hydraulic setting elements, which are activated by a transmission control device.

German Patent Document DE 4422257 C1 describes a driving position selector for an automatic transmission, for which the parking position is selected automatically after the ignition is switched off. In order to be able to tow the vehicle when the driving position selector fails to function and the parking position is engaged, it is described that the parking position can be disengaged by the driver by an emergency release, which can be operated by the driver. This emergency release is constructed as an operative connection, such as a Bowden cable, between a manual lever, which can be operated by a driver, and a release device for the parking position.

For this parking position emergency release, a mechanical connection, such as a Bowden cable, is required between the control device and the release device in the transmission.

It is an object of the invention, to make available a driving position selector with an emergency release for the parking position of an automatic transmission, for which the control device no longer has a mechanical connection with the release device in the transmission and is constructed simply.

This objective is achieved according to preferred embodiments of the invention, by providing that the swiveling motion of the release lever is not transferred to the Bowden traction cord, since the release lever can move along a Bowden traction cord suspended in the release lever, because positive locking between the Bowden traction cord and the release lever over a thickening of the Bowden traction cord can be attained only if the operating device is activated. Further advantageous developments of preferred embodiments of the invention are set forth in the following description and the claims.

Pursuant to the invention, a driving position selector is provided for selecting at least the operating positions of the automatic transmission, "D", "N", "R", "P" (of an automobile), which are selected by the driver over a control device and engaged by electro-hydraulic setting elements activated by a transmission control device. It is possible to disengage a parking position, engaged in the "P" driving position, by a release device in the automatic transmission housing, which can be activated by the driver over an operating device, especially a hand lever, for which reason the operating device is connected by a Bowden cable to a release lever of the release device. The release lever is mounted firmly on an axis, which is rotated forward and backward when the parking position is engaged and disengaged by the electro-hydraulic setting elements. With that, the axis swivels the release lever back and forth. Since the release lever can move along a Bowden traction cord suspended in the release lever, the swiveling motion of the release lever is not transferred to the Bowden cable because positive locking between the Bowden traction cord and the release lever over a thickening of the Bowden traction cord can be attained only if the operating device is activated.

Such a configuration of an emergency release of the parking position advantageously operates with few components and can be integrated simply in many vehicle designs.

A preferred embodiment of the invention is characterized in that a bracket is constructed at the release lever, through which the Bowden traction cord extends and that, as seen from the release lever, the operating device is mounted on one side of the Bowden traction cord and the thickening is mounted on the other side and is configured so that it cannot be pulled through the bracket.

This has the advantage that the individual parts of the emergency release of the parking position are constructed very simply and can be installed easily.

A further preferred embodiment of the invention is characterized in that the thickening of the Bowden traction cord is produced at a place, which is at such a distance from the release lever, that it is possible for the release lever to carry out its rotational movement with the axis, when the parking position is engaged and disengaged by the electro-hydraulic setting elements. However, when the parking position is engaged, the thickening of the Bowden traction cord comes into contact with the release lever when the activating device is activated and as a result, the parking position is bought from its engaged position into its disengaged position.

This is one embodiment of the invention, which furthermore can be installed quickly and is not very interference prone.

A preferred example of the invention is described in the following in conjunction with the associated drawing.

Other objects, advantages and novel features of the present invention will become apparent from the following detailed description of the invention when considered in conjunction with the accompanying drawings.

BRIEF DESCRIPTION OF THE DRAWINGS

FIG. 1 shows a representation of a release device at the automatic transmission housing.

FIG. 2 shows a release lever of the release device after it has been rotated.

FIG. 3 shows the supporting bracket of the release device after the latter has been rotated.

DETAILED DESCRIPTION OF THE DRAWINGS

According to FIG. 1, a release device for a parking position of an automatic transmission includes a release lever 1, 1', which is fixed to an axis or axle 3, which is turned forward and backward when the parking position is engaged and disengaged by selections on a driving position selector 14 In this connection, the concept of turning forwards describes a rotation of the axis 3 in the clockwise direction and the concept of turning backward describes a rotation of the axis 3 in the counter-clockwise direction. The release lever 1, 1', which is connected with the axis 3 so that there cannot be independent rotation, always turns with the axis 3, when the driving position "P" of the automatic transmission of the vehicle is engaged or disengaged by the electro-hydraulic setting elements, which are actuated by the transmission control device.

The release device for the parking position is located at the automatic transmission housing, which has not been drawn, and is schematically indicated by a section A. The housing includes the transmission control device and the electro-hydraulic setting elements. The release lever 1, 1', for connecting a release device for the activation of the release device, protrudes out of the housing of the automatic transmission.

The release lever 1' is drawn in a different possible position 1' by broken lines. In the turned-forwards position shown, the parking position of the automatic transmission is engaged at P. If the release lever 1 is turned back counterclockwise, the parking position of the automatic transmission is disengaged at P'.

The release lever 1, 1' is constructed as a U-shaped lever (FIG. 2). A Bowden traction cord 4 is inserted in a U-shaped bracket 2. This cord extends through the bracket 2 and, as seen from the release lever 1, 1', leads the Bowden traction cord 4 on one side to a hand lever 13 of an operating device in the interior of a vehicle, which is not shown. At a different side, the Bowden traction cord 4 is attached to a thickening 5, which is configured so that it cannot be pulled through the bracket 2.

When the driver actuates the hand lever 13 of the operating device, the release lever 1 is turned back from its position, in which the parking position P is engaged, into its position 1', in which the parking position is not engaged P'. This is done because the thickening 5 is attached on the other side of the lever on the Bowden traction cord 4 and is configured so that it cannot be pulled through the bracket 2.

A return spring 9 brings the Bowden traction cord 4 back into the illustrated position after the parking position has been disengaged by means of the release lever 1, 1'. The return spring 9 and a section of the Bowden traction cord 8 are fastened to a bracket 7 and inserted in a further bracket 6, secured by metal sleeves 10, 11 and a split pin 12.

It is not necessary to reset the release lever 1' manually, since it is reset by the electro-hydraulic setting elements in the automatic transmission. So that this is possible, the thickening 5 at the Bowden traction cord 4 is mounted at a place, which is at such a distance from the release lever 1, 1', that the release lever 1, 1' can carry out its turning motion relative with the axis 3, when the parking position is brought into and out of engagement by the electro-hydraulic setting elements. However, when the parking position P is engaged, the thickening 5 of the Bowden traction cord 4 comes into contact with the release lever 1, when the operating device is activated. By this, the parking position is brought into its disengaged position P' before it is brought into the engaged position P.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driving position selector for selecting operating positions of an automatic transmission of an automobile,
    said positions being engaged by electro-hydraulic setting elements activated by a transmission control device, a release device in the automatic transmission housing operable to disengage a transmission parking position,
    said release device being activatable by a manual operating device,
    said operating device being connected by a Bowden cable to a release lever of the release device, the release lever being mounted on a rotating member which is rotatable back and forth by the electro-hydraulic setting elements when the parking position is engaged and disengaged, and
    said rotating member being operable to swivel the release lever forward and backward,
    wherein the release lever is configured to move along the Bowden cable, which is suspended in the release lever, unless the operating device is activated whereby a thickening in the Bowden cable forms a positive locking between the Bowden cable and the release lever and disengages the parking position.

2. The driving position selector of claim 1, wherein the Bowden cable extends through a bracket constructed at the release lever and, on a first side of the release lever the operating device is mounted and, on a second side, the thickening is configured on the Bowden cable which is configured so that said thickening cannot be pulled through the bracket.

3. The driving position selector of claim 2, wherein the thickening on the Bowden cable is mounted at a distance from the release lever, so that the release lever can turn with the rotating member, when the parking position is engaged and disengaged by the electro-hydraulic setting elements, the thickening of the Bowden cable further configured to contact the release lever, when the parking position is engaged, and the parking position is disengaged when the operating device is actuated.

4. A release device for disengaging a parking position of an automatic transmission of an automobile, comprising:
    a rotatable release lever and pivoting member which can engage and disengage the parking position,
    a manual operating device connected to the release lever by a Bowden cable, wherein the Bowden cable is suspended in the release lever whereby the release lever can move along the Bowden cable without transferring motion to the Bowden cable, and
    a thickening located on the Bowden cable whereby the manual operating device moves the thickening into contact with the rotatable release lever and thereby rotates the release lever and the pivoting member and disengages the parking position in order to tow the automobile.

5. A release device for disengaging a parking position of an automatic transmission, comprising a rotatable release lever which can disengage the parking position and rotates to indicate engagement and disengagement of the parking position by a transmission control device,
- a manual operating device connected to the rotatable release lever by a Bowden cable suspended in the rotatable release lever,
- said Bowden cable having a thickening located to rotate the rotatable release lever and thereby disengage the parking position when the manual operating device is actuated, wherein the rotatable release lever does not transfer motion to the Bowden cable during normal shifting operation.

6. A method of making a parking position release device for an automatic transmission of an automobile, comprising the acts of;
- providing the automatic transmission comprising a transmission control device which activates electro-hydraulic setting elements for engaging driving positions and a release device with a release lever which is rotated back and forth by the electro-hydraulic setting elements when the parking position is engaged and disengaged,
- connecting the release lever to a manual operating device by a Bowden traction cord,
- whereby the release lever is configured so as not to transfer rotating motion to the Bowden traction cord since the release lever can move along the Bowden traction cord suspended in the release lever during normal shifting operation, and only activation of the manual operating device attains a positive motion transfer between a thickening of the Bowden traction cord and the release lever to disengage the parking position.

* * * * *